(12) United States Patent
Zhu et al.

(10) Patent No.: US 11,117,563 B2
(45) Date of Patent: Sep. 14, 2021

(54) INTEGRATED ELECTRIC BOOSTER BRAKING SYSTEM WITH PEDAL FORCE COMPENSATION FUNCTION

(71) Applicant: Jilin University, Changchun (CN)

(72) Inventors: Bing Zhu, Changchun (CN); Yihan Zhang, Changchun (CN); Jian Zhao, Changchun (CN); Zhicheng Chen, Changchun (CN); Lun Li, Changchun (CN); Xiaotong Guo, Changchun (CN); Xiaowen Tao, Changchun (CN); Zhiwei Wang, Changchun (CN); Zhipeng Bao, Changchun (CN); Gang Yang, Changchun (CN)

(*) Notice: Subject to any disclaimer, the term of this patent is extended or adjusted under 35 U.S.C. 154(b) by 102 days.

(21) Appl. No.: 16/741,774

(22) Filed: Jan. 14, 2020

(65) Prior Publication Data
US 2020/0148186 A1   May 14, 2020

(30) Foreign Application Priority Data
Aug. 16, 2019   (CN) .......................... 201910756118.X

(51) Int. Cl.
| | |
|---|---|
| *B60T 13/74* | (2006.01) |
| *B60T 7/04* | (2006.01) |
| *B60T 8/40* | (2006.01) |
| *B60T 13/14* | (2006.01) |
| *B60T 13/66* | (2006.01) |
| *B60L 7/26* | (2006.01) |
| *B60T 13/58* | (2006.01) |

(52) U.S. Cl.
CPC ............ *B60T 13/745* (2013.01); *B60T 7/042* (2013.01); *B60T 8/4081* (2013.01); *B60T 13/145* (2013.01); *B60T 13/662* (2013.01); *B60T 13/746* (2013.01); *B60L 7/26* (2013.01); *B60T 13/586* (2013.01)

(58) Field of Classification Search
CPC ............................ B60T 13/745; B60T 13/746
See application file for complete search history.

(56) References Cited

U.S. PATENT DOCUMENTS

| | | | | |
|---|---|---|---|---|
| 5,094,079 | A * | 3/1992 | Leigh-Monstevens | ...................... F16D 48/066 60/545 |
| 9,108,610 | B2 * | 8/2015 | Philippe | ................ B60T 13/745 |
| 10,549,741 | B2 * | 2/2020 | Nagel | ................... B60T 13/575 |
| 2008/0231109 | A1 * | 9/2008 | Yamada | ................ B60T 8/4275 303/20 |

(Continued)

*Primary Examiner* — Bradley T King

(57) ABSTRACT

An integrated electric booster braking system with a pedal force compensation function, comprising a booster motor, a first gear, a second gear, a lead screw, a brake master cylinder, a pedal push rod, a master cylinder push rod, a fluid storage tank, a hydraulic control unit and an electric control unit, wherein first gear and second gear are assembled in a housing, first gear is engaged with the second gear, the booster motor is connected with the first gear and drives the first gear to rotate, the first gear drives the second gear to rotate during rotation, the second gear is in threaded connection with the lead screw, the second gear drives the lead screw to move during rotation, the lead screw is of a hollow structure, and the rear end of the lead screw is abutted with the front end of a first piston in the brake master cylinder.

6 Claims, 2 Drawing Sheets

(56) References Cited

U.S. PATENT DOCUMENTS

| | | | |
|---|---|---|---|
| 2016/0016569 A1* | 1/2016 | Odaira | B60T 13/745 |
| | | | 303/15 |
| 2016/0280196 A1* | 9/2016 | Zhang | B60T 13/745 |
| 2017/0297546 A1* | 10/2017 | Takeda | B60T 13/662 |
| 2018/0001881 A1* | 1/2018 | Huang | B60T 13/66 |
| 2018/0105156 A1* | 4/2018 | Kishi | B60T 8/4077 |
| 2021/0046909 A1* | 2/2021 | Saotome | B60T 13/745 |

* cited by examiner

INTEGRATED ELECTRIC BOOSTER BRAKING SYSTEM WITH PEDAL FORCE COMPENSATION FUNCTION

TECHNICAL FIELD

The present invention relates to an integrated electric booster braking system, particularly to an integrated electric booster braking system with a pedal force compensation function.

BACKGROUND

At present, with the rapid development of electric vehicles and intelligent vehicles, it is difficult for the traditional vacuum booster type hydraulic braking system to meet the functional requirements of intelligent electric vehicles for regenerative braking and active braking. Since being capable of achieving partial decoupling or complete decoupling between the brake pedal and the master cylinder through reasonable structural design, the electric booster braking system can be applied to an electric vehicle to realize braking energy recovery; in addition, although the electric booster braking system retains the hydraulic boosting structure, as a wire-controlled system, the response speed and pressure control accuracy thereof are significantly improved as compared with the traditional vacuum booster braking system, moreover, the electric booster braking system can actively build up voltage independently of the braking action of the driver, can have active braking capability, and can be used as a bottom actuator of the intelligent driver assistance system. To sum up, the electric booster braking system and control method therefor become the mainstream directions of intelligentizion and electrification of vehicle braking systems.

However, the current popular electric booster braking system uses a rubber feedback disc to couple the pedal force of the driver with the assisted force of the motor. This coupling method causes stiff pedal foot feeling due to the small deformation of the feedback disc and the motor delay. Moreover, under the regenerative braking condition, since the complete decoupling between the brake master cylinder and the wheel cylinder cannot be achieved, the hydraulic force generated by anti-dragged braking of the motor may reversely act onto the feedback disc, thus causing the phenomenon of "butting foot" by the brake pedal.

Some electro-hydraulic braking systems adopt a complete decoupling solution. Since the pedal feeling is simulated by adjusting hardware such as the fluid storage tank, springs and the like, the simulated pedal feeling is different from the traditional pedal feeling and cannot match the delicate electric components and control algorithms, thereby being complicated in structure, high in cost and inconvenient for real vehicle arrangement.

SUMMARY

The purpose of the present invention is to provide an integrated electric booster braking system with a pedal force compensation function in order to solve a lot of problems existing in the process of using an existing electric booster braking system of a vehicle.

The integrated electric booster braking system with a pedal force compensation function provided by the present invention comprises a booster motor, a first gear, a second gear, a lead screw, a brake master cylinder, a pedal push rod, a master cylinder push rod, a fluid storage tank, a hydraulic control unit and an electric control unit, wherein the first gear and the second gear are assembled in a housing, the first gear is engaged with the second gear, the booster motor is connected with the first gear and drives the first gear to rotate, the first gear drives the second gear rotate during rotation, the second gear is in threaded connection with the lead screw, the second gear drives the lead screw move during rotation, the lead screw is of a hollow structure, the rear end of the lead screw is abutted with the front end of a first piston in the brake master cylinder, the pedal push rod penetrates through the side wall of the housing and then is inserted in an inner cavity of the lead screw, the rear end of the pedal push rod is hinged with the front end of the master cylinder push rod, the rear portion of the master cylinder push rod is inserted in the first piston in the brake master cylinder, the brake master cylinder is assembled at the rear end of the housing, the fluid storage tank is in communication with an inner cavity of the brake master cylinder by a pipeline, the inner cavity of the brake master cylinder is in communication with the hydraulic control unit by a pipeline, the electric control unit is connected with the booster motor and the hydraulic control unit, and the electric control unit controls the operation of the booster motor and the hydraulic control unit.

A pedal travel sensor is assembled on the pedal push rod, the pedal travel sensor is connected with the electric control unit, the pedal travel sensor can transmit the real-time displacement data of the pedal push rod to the electric control unit, and a first reset spring is disposed between the pedal push rod and the side wall of the housing.

The diameter of the first gear is less than that of the second gear, a ball is disposed between the second gear and the lead screw for transmission, a mounting bracket is assembled in the housing, the second gear is connected with the mounting bracket by a bearing, two guide posts are disposed on the mounting bracket, slide blocks are sleeved on the guide posts respectively, a connecting frame is disposed between the two slide blocks, the front end of the lead screw is fixed to the connecting frame, and the lead screw drives the two slide blocks to synchronously slide on the guide posts during movement.

The first piston and a second piston are assembled in the inner cavity of the brake master cylinder, a first working chamber is formed in the inner cavity of the brake master cylinder between the first piston and the second piston, a second working chamber is formed between the rear end of the second piston and the rear end of the inner cavity of the brake master cylinder, a second reset spring is assembled in the second working chamber, the fluid storage tank is in communication with the first working chamber and the second working chamber respectively by pipelines, the rear portion of the master cylinder push rod is inserted in first piston, the master cylinder push rod is of a diameter-variable structure, the diameter of the two end portions of the master cylinder push rod is greater than that of the middle portion of the master cylinder push rod, the outer diameter of the front end portion of the master cylinder push rod corresponds to the inner diameter of the inner cavity of the lead screw, a limit stop is disposed on the middle portion of the master cylinder push rod, and both sides of the limit stop are provided with pedal force compensation springs respectively.

The first working chamber is connected with the hydraulic control unit by a first fluid transfusion pipeline, the first fluid transfusion pipeline is equipped with a hydraulic pressure sensor, a first solenoid valve and a first proportional valve in sequence, the second working chamber is connected with the hydraulic control unit by a second fluid transfusion pipeline, the fluid transfusion pipeline is equipped with a second solenoid valve and a second proportional valve in sequence, a connecting pipeline is disposed between the first solenoid valve and the second solenoid valve, the connecting pipeline is in communication with the fluid storage tank by a third fluid transfusion pipeline, the hydraulic pressure sensor, the first solenoid valve, the second solenoid valve, the first proportional valve and the second proportional valve are all connected with the electric control unit, the hydraulic pressure sensor can transmit the real-time data on the first fluid transfusion pipeline into the electric control unit, and the electric control unit controls the operation of the first solenoid valve, the second solenoid valve, the first proportional valve and the second proportional valve.

Both the first solenoid valve and the second solenoid valve are two-position three-way solenoid valves.

The hydraulic control unit is connected with a brake wheel cylinder, and the hydraulic control unit controls the operation of the brake wheel cylinder.

The booster motor, the hydraulic control unit, the electric control unit, the pedal travel sensor, the hydraulic pressure sensor, the first solenoid valve, the second solenoid valve, the first proportional valve, the second proportional valve and the brake wheel cylinder are all assemblies of the existing device, therefore, the specific models and the specifications are not repeated in detail.

The present invention has the operating principle that:

The integrated electric booster braking system with a pedal force compensation function provided by the present invention has four operating modes such as electric booster braking, regenerative braking, active braking and failure backup, specifically as follows:

1. Electric Booster Braking Function:

When a system is in the electric booster braking mode, a driver steps on the brake pedal, and the pedal push rod overcomes the resistance from the first reset spring to translate to the right, penetrates through the housing and then is hinged with the master cylinder push rod in the inner cavity of the lead screw, thus pushing the master cylinder push rod to penetrate through the inner cavity of the lead screw and the inner cavity of the first piston, overcome the spring force of the two pedal force compensation springs and act on the brake fluid in the first working chamber, achieving the voltage buildup of the brake master cylinder through manpower. In this process, by interacting with the limit stop on the master cylinder push rod, the two pedal force compensation springs solve the problem of stiff coupling between the pedal force of the driver and the assisted force of the motor, and the pedal force compensation springs ensure that the driver can obtain the same pedal feeling as the traditional braking system. At the same time, the pedal travel sensor collects the displacement of the pedal push rod, sends a displacement signal to the electric control unit; the electric control unit analyzes the braking intention of the driver according to the pedal travel information, obtains the value of assisted force required for the booster motor through a booster characteristic curve, and sends a control instruction to the booster motor; the booster motor produces the corresponding rotational speed and torque according to the instruction, an output shaft of the booster motor drives the first gear to drive the second gear to rotate, and the second gear drives the lead screw to translate to the right through the ball structure, thus pushing the first piston to act on the brake fluid in the first working chamber, achieving the voltage buildup of the brake master cylinder through electric assisted force.

In this process, the manpower generated due to the fact that the driver steps on the pedal is coupled with the assisted force of the motor through a hydraulic surface within the first working chamber in the brake master cylinder. In the electric booster braking mode, the two solenoid valves and the two proportional valves are powered off and in the position shown in the figure, and the two proportional valves are at the maximum degree of opening at this moment.

When the driver loosens the brake pedal, the pedal push rod is reset under the action of the first reset spring, the master cylinder push rod is reset under the action of the pedal force compensation springs, and an electric booster mechanism is reversely reset through the booster motor.

II. Regenerative Braking Function:

For a vehicle equipped with a regenerative braking device, when the system determines that the vehicle only needs the regenerative braking force generated by the regenerative braking device to complete braking, the electric control unit issues corresponding control instructions to power on both the first solenoid valve and the second solenoid valve. At this time, the brake fluid in the brake master cylinder will flow back into the fluid storage tank through the first solenoid valve and the second solenoid valve. The braking force required for the vehicle is completely generated by of the anti-dragged braking of the motor, that is, the electric booster braking mode does not participate in braking work, and the pedal feeling of the driver is simulated by the first reset spring, the pedal force compensation springs and the second reset spring together. There is no need to specially set a pedal feeling simulator to simulate braking feeling. In addition, the pedal feeling can be adjusted through the pedal force compensation springs by adjusting the action of the booster motor.

When the vehicle requires large braking deceleration, if the system determines that the regenerative braking force and friction braking force work together to meet the requirement of the vehicle for braking force, the electric control unit issues control instructions to power off the first solenoid valve and the second solenoid valve, and the electric control unit analyzes the braking intention of the driver according to the pedal travel information, and calculates the total braking force FS required for this braking. For a new-energy vehicle, the electric control unit calculates the regenerative braking force FR that the vehicle can generate at this moment according to the operating states of a power motor and a storage battery of the vehicle at this moment, the electric control unit controls the first proportional valve and the second proportional valve simultaneously to generate corresponding degrees of opening, and the total braking force FS subtracts the regenerative braking force FR, so that the hydraulic braking force FH required for this braking is obtained, that is, FH=FS−FR. The electric control unit obtains the value of assisted force required for the booster motor through the booster characteristic curve according to the magnitude of the hydraulic braking force FH and sends a control instruction to the booster motor. The booster motor produces the corresponding rotational speed and torque according to the instruction. An output shaft of the booster motor drives the first gear to drive the second gear to rotate. The second gear drives the lead screw to translate to the right through the ball structure, thereby pushing the first piston to act on the first working chamber filled with brake fluid, act together with the master cylinder push rod to provide voltage buildup for the first working chamber in the brake master cylinder, and then pushing the second piston to provide voltage buildup for the second working chamber, to generate hydraulic braking force in the brake wheel cylinder.

Meanwhile, the regenerative braking device acts to generate regenerative braking force, and the two constitute the vehicle braking force together.

III. Active Braking Function:

For a vehicle equipped with a speed sensor and a ranging sensor, when the driver does not step on the brake pedal, that is, the pedal travel sensor does not detect a displacement signal, when it is learned that the distance between the vehicle and the obstacle ahead is too short through the measurement of the speed sensor and ranging sensor, and braking measures must be taken to prevent collision or other dangerous behaviors, the electric control unit analyzes a signal transmitted by other vehicle-mounted sensors, determines the active braking force required for the vehicle, and sends an instruction to the booster motor through a control circuit. The booster motor drives the first gear to drive the second gear to rotate according to the instruction, and the second gear drives the lead screw to translate to the right, thereby pushing the first piston to translate to the right and drive the master cylinder push rod to provide voltage buildup for the first working chamber in the brake master cylinder together, and then pushing the second piston to provide voltage buildup for the second working chamber, so that active braking-by wire is achieved. Meanwhile, the master cylinder push rod may also drive the pedal push rod to translate to the right, so that the brake pedal at the driver will act, which will remind the driver of the danger ahead.

IV. Failure Backup Function:

When the booster motor or a transmission part in the system fails due to failure, both the first solenoid valve and the second solenoid valve are in a power-off state, and both the first proportional valve and the second proportional valve are at the maximum degree of opening. When the driver steps on the brake pedal, the pedal push rod can push the master cylinder push rod to act on the first working chamber filled with hydraulic fluid, thereby pushing the second piston to establish hydraulic pressure in the second working chamber. The brake fluid can enter the hydraulic control unit through the pipeline and then flow into the brake wheel cylinder to meet the minimum requirement of the vehicle for braking force.

The present invention has the following advantageous effects that:

The integrated electric booster braking system with a pedal force compensation function provided by the present invention does not use a feedback disc to couple the pedal force of the driver with the assisted force of the motor, but uses a hydraulic surface to couple the master cylinder push rod with the motor booster piston, uses the structure of setting the pedal force compensation springs in the master cylinder piston, and solves the problem of stiff pedal feeling of the conventional feedback disc-type electric booster braking system in the conventional power-assisted mode. The present invention uses motor drive and mechanical structure transmission to convert the rotation output of the motor into translation output, has large transmission ratio, high transmission efficiency, compact structure, precise pressure control and rapid response, can establish sufficient braking pressure in a short time, and has active braking capability. Since the present invention cancels the pedal feeling simulator in the failure backup mode, there is no idle travel, the response speed is fast, and the operation is more reliable, and the driver can achieve vehicle braking through quick voltage buildup of the brake pedal. The present invention can achieve the complete decoupling between the pedal force and the assisted force of the motor in the regenerative braking mode, and can solve the problem of "butting foot" by the pedal on the premise of guaranteeing the energy recovery effect, so that the driver can obtain the same pedal feeling as the traditional braking system.

1. booster motor; 2. first gear; 3. second gear; 4. lead screw; 5. brake master cylinder; 6. pedal push rod; 7. master cylinder push rod; 8. fluid storage tank; 9. hydraulic control unit; 10. electric control unit; 11. housing; 12. first piston; 13. pedal travel sensor; 14. first reset spring; 15. ball; 16. mounting bracket; 17. bearing; 18. guide post; 19. slide block; 20. connecting frame; 21. second piston; 22. first working chamber; 23. second working chamber; 24. second reset spring; 25. limit stop; 26. pedal force compensation spring; 27. first fluid transfusion pipeline; 28. hydraulic pressure sensor; 29. first solenoid valve; 30. first proportional valve; 31. second fluid transfusion pipeline; 32. second solenoid valve; 33. second proportional valve; 34. connecting pipeline; 35. third fluid transfusion pipeline; 36. brake wheel cylinder.

DETAILED DESCRIPTION

Figure 1:
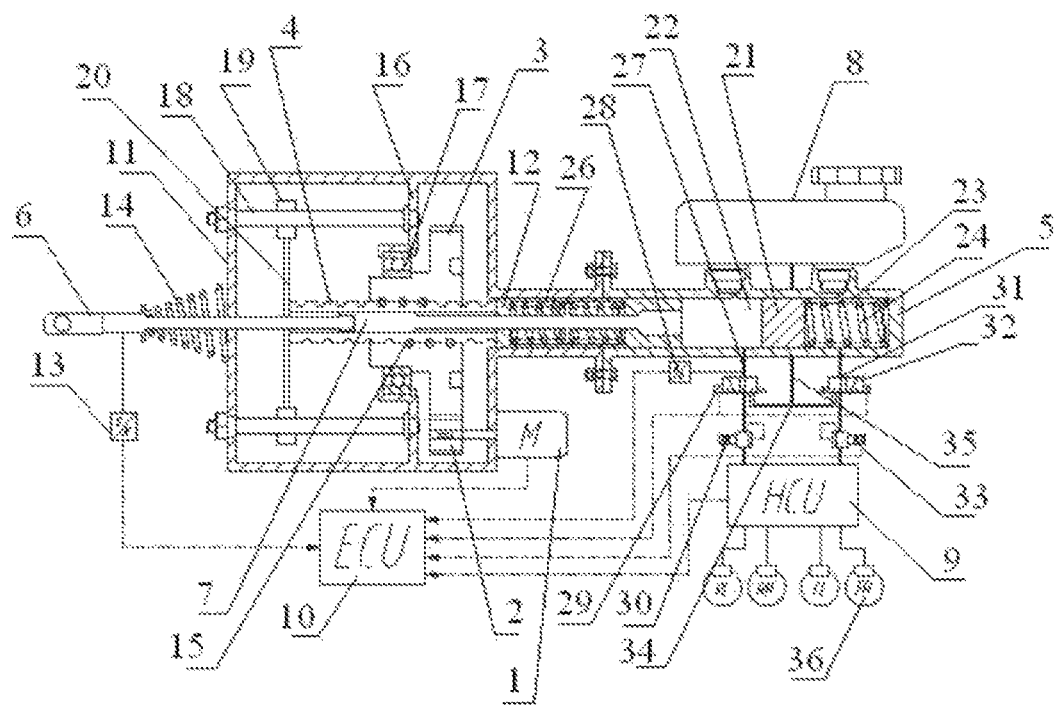
FIG. 1 is an integral structural schematic diagram of an electric booster braking system of the present invention.
Figure 2:
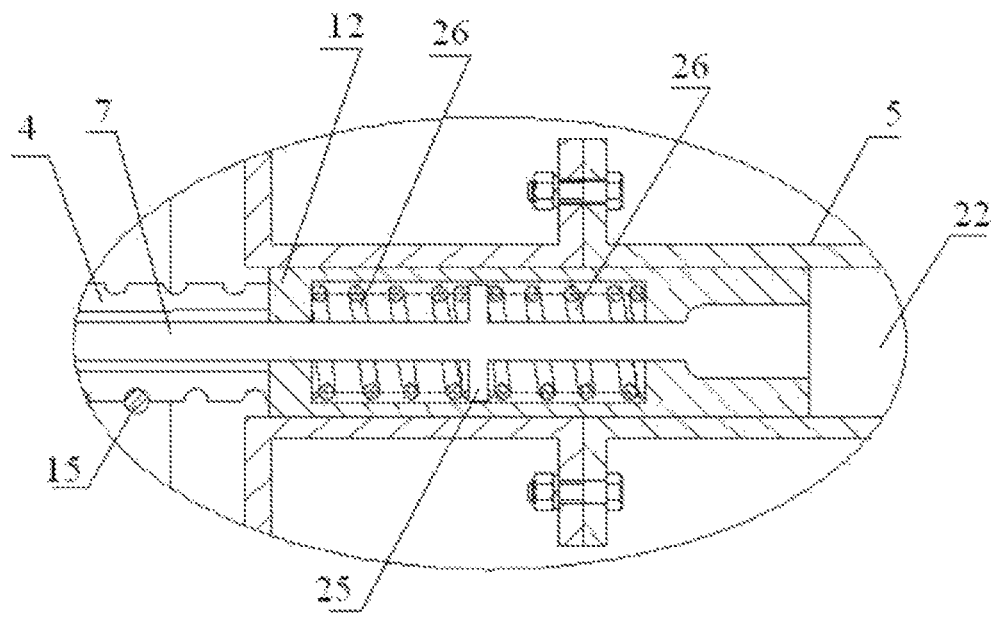
FIG. 2 is an enlarged schematic diagram of a connecting structure between a master cylinder push rod and a first piston of the present invention.
Figure 3:
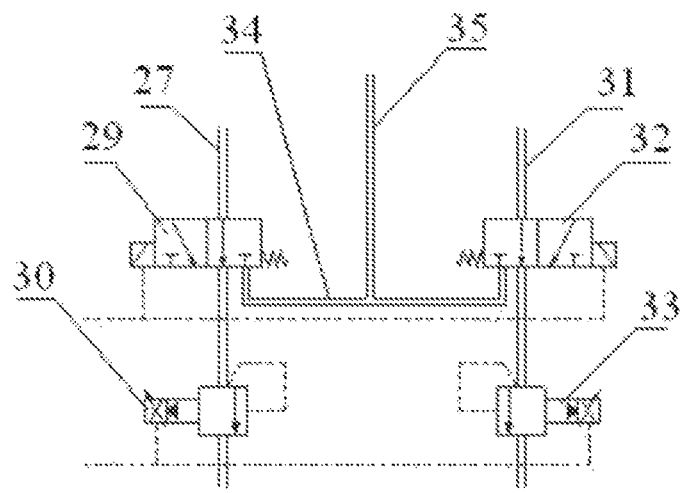
FIG. 3 is a schematic diagram showing a power-off state of a solenoid valve of the present invention.
Figure 4:
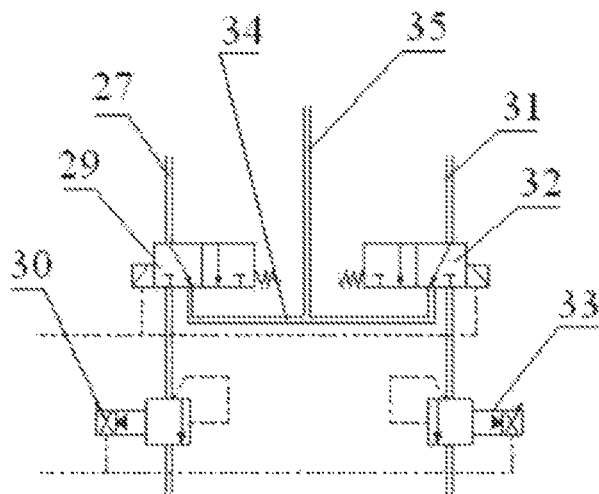
FIG. 4 is a schematic diagram showing a power-on state of a solenoid valve of the present invention. Reference numbers in the above figure are as follows.

As shown in FIG. 1 to FIG. 4:

The integrated electric booster braking system with a pedal force compensation function provided by the present invention comprises a booster motor 1, a first gear 2, a second gear 3, a lead screw 4, a brake master cylinder 5, a pedal push rod 6, a master cylinder push rod 7, a fluid storage tank 8, a hydraulic control unit 9 and an electric control unit 10, wherein the first gear 2 and the second gear 3 are assembled in a housing 11, the first gear 2 is engaged with the second gear 3, the booster motor 1 is connected with the first gear 2 and drives the first gear 2 to rotate, the first gear 2 dives the second gear 3 to rotate during rotation, the second gear 3 is in threaded connection with the lead screw 4, the second gear 3 drives the lead screw 4 to move during rotation, the lead screw 4 is of a hollow structure, the rear end of the lead screw 4 is abutted with the front end of a first piston 12 in the brake master cylinder 5, the pedal push rod 6 penetrates through the side wall of the housing 11 and is inserted in an inner cavity of the lead screw 4, the rear end of the pedal push rod 6 is hinged with the front end of the master cylinder push rod 7, the rear portion of the master cylinder push rod 7 is inserted in the first piston 12 in the brake master cylinder 5, the brake master cylinder 5 is assembled at the rear end of the housing 11, the fluid storage tank 8 is in communication with an inner cavity of the brake master cylinder 5 by a pipeline, the inner cavity of the brake master cylinder 5 is in communication with the hydraulic control unit 9 by a pipeline, the electric control unit 10 is connected with the booster motor 1 and the hydraulic control unit 9, and the electric control unit 9 controls the operation of the booster motor 1 and the hydraulic control unit 9.

A pedal travel sensor 13 is assembled on the pedal push rod 6, the pedal travel sensor 13 is connected with the electric control unit 10, the pedal travel sensor 13 can transmit the real-time displacement data of the pedal push rod 6 to the electric control unit 10, and a first reset spring 14 is disposed between the pedal push rod 6 and the side wall of the housing 11.

The diameter of the first gear 2 is less than that of the second gear 3, a ball 15 is disposed between the second gear 3 and the lead screw 4 for transmission, a mounting bracket 16 is assembled in the housing 11, the second gear 3 is connected with the mounting bracket 16 by a bearing 17, two guide posts 18 are disposed on the mounting bracket 16, slide blocks 19 are sleeved on the guide posts 18 respectively, a connecting frame 20 is disposed between the two slide blocks 19, the front end of the lead screw 4 is fixed to the connecting frame 20, and the lead screw 4 drives the two slide blocks 19 to synchronously slide on the guide posts 18 during movement. The first piston 12 and a second piston 21 are assembled in the inner cavity of the brake master cylinder 5. A first working chamber 22 is formed in the inner cavity of the brake master cylinder 5 between the first piston 12 and the second piston 21. A second working chamber 23 is formed between the rear end of the second piston 21 and the rear end of the inner cavity of the brake master cylinder 5. A second reset spring 24 is assembled in the second working chamber 23. The fluid storage tank 8 is in communication with the first working chamber 22 and the second working chamber 23 respectively by pipelines, the rear portion of the master cylinder push rod 7 is inserted in the first piston 12, the master cylinder push rod 7 is of a diameter-variable structure, the diameter of the two end portions of the master cylinder push rod 7 is greater than that of the middle portion of the master cylinder push rod 7, the outer diameter of the front end portion of the master cylinder push rod 7 corresponds to the inner diameter of the inner cavity of the lead screw 4, a limit stop 25 is disposed on the middle portion of the master cylinder push rod 7, and both sides of the limit stop 25 are provided with pedal force compensation springs 26 respectively.

The first working chamber 22 is connected with the hydraulic control unit 9 by a first fluid transfusion pipeline 27, the first fluid transfusion pipeline 27 is equipped with a hydraulic pressure sensor 28, a first solenoid valve 29 and a first proportional valve 30 in sequence, the second working chamber 23 is connected with the hydraulic control unit 9 by a second fluid transfusion pipeline 31, the second fluid transfusion pipeline 31 is equipped with a second solenoid valve 32 and a second proportional valve 33 in sequence, a connecting pipeline 34 is disposed between the first solenoid valve 29 and the second solenoid valve 32, the connecting pipeline 34 is in communication with the fluid storage tank 8 by a third fluid transfusion pipeline 35, the hydraulic pressure sensor 28, the first solenoid valve 29, the second solenoid valve 32, the first proportional valve 30 and the second proportional valve 33 are all connected with the electric control unit 10, the hydraulic pressure sensor 28 can transmit the real-time data on the first fluid transfusion pipeline 27 into the electric control unit 10, and the electric control unit 10 controls the operation of the first solenoid valve 29, the second solenoid valve 32, the first proportional valve 30 and the second proportional valve 33.

Both the first solenoid valve 29 and the second solenoid valve 32 are two-position three-way solenoid valves.

The hydraulic control unit 9 is connected with a brake wheel cylinder 36, and the hydraulic control unit 9 controls the operation of the brake wheel cylinder 36. The booster motor 1, the hydraulic control unit 9, the electric control unit 10, the pedal travel sensor 13, the hydraulic pressure sensor 28, the first solenoid valve 29, the second solenoid valve 32, the first proportional valve 30, the second proportional valve 33 and the brake wheel cylinder 36 are all assemblies of the existing device, therefore, the specific models and the specifications are not repeated in detail.

The present invention has the operating principle that:

The integrated electric booster braking system with a pedal force compensation function provided by the present invention has four operating modes such as electric booster braking, regenerative braking, active braking and failure backup, specifically as follows:

1. Electric Booster Braking Function:

When a system is in the electric booster braking mode, a driver steps on the brake pedal, and the pedal push rod 6 overcomes the resistance from the first reset spring 14 to translate to the right, penetrates through the housing 11 and then is hinged with the master cylinder push rod 7 in the inner cavity of the lead screw 4, thus pushing the master cylinder push rod 7 to penetrate through the inner cavity of the lead screw 4 and the inner cavity of the first piston 12, overcome the spring force of the two pedal force compensation springs 26 and act on the brake fluid in the first working chamber 22, achieving the voltage buildup of the brake master cylinder 5 through manpower. In this process, by interacting with the limit stop 25 on the master cylinder push rod 7, the two pedal force compensation springs 26 solve the problem of stiff coupling between the pedal force of the driver and the assisting force of the booster motor 1, and the pedal force compensation springs 26 ensure that the driver can obtain the same pedal feeling as the traditional braking system. At the same time, the pedal travel sensor 13 collects the displacement of the pedal push rod 6, and sends a displacement signal to the electric control unit 10; the electric control unit 10 analyzes the braking intention of the driver according to the pedal travel information, obtains the value of assisted force required for the booster motor 1 through a booster characteristic curve, and sends a control instruction to the booster motor 1; the booster motor 1 produces the corresponding rotational speed and torque according to the instruction, an output shaft of the booster motor 1 drives the first gear 2 to drive the second gear 3 to rotate, and the second gear 3 drives the lead screw 4 to translate to the right through the ball structure, thus pushing the first piston 12 to act on the brake fluid in the first working chamber 22, achieving the voltage buildup of the brake master cylinder 5 through electric assisted power.

In this process, the manpower generated due to the fact that the driver steps on the pedal is coupled with the assisted force of the motor through a hydraulic surface in the first working chamber 22 in the brake master cylinder 5. In the electric booster braking mode, the first solenoid valve 29 and the second solenoid valve 32, and the first proportional valve 30 and the second proportional valve 33 are powered off and in the position shown in the figure, and the first proportional valve 30 and the second proportional valve 33 are at the maximum degree of opening at this moment.

When the driver loosens the brake pedal, the pedal push rod 6 is reset under the action of the first reset spring 14, the master cylinder push rod 7 is reset under the action of the pedal force compensation springs 26, and an electric booster mechanism is reversely reset through the booster motor 1.

II. Regenerative Braking Function:

For a vehicle equipped with a regenerative braking device, when the system determines that the vehicle only needs the regenerative braking force generated by the regenerative braking device to complete braking, the electric control unit 10 issues corresponding control instructions to power on both the first solenoid valve 29 and the second solenoid valve 32. At this time, the brake fluid in the brake master cylinder 5 will flow back into the fluid storage tank 8 through the first solenoid valve 29 and the second solenoid valve 32. The braking force required for the vehicle is completely generated by the anti-dragged braking of the motor, that is, the electric booster braking mode does not participate in braking work, and the pedal feeling of the driver is simulated by the first reset spring 14, the pedal force compensation springs 26 and the second reset spring 24 together. There is no need to specially set a pedal feeling simulator to simulate braking feeling. In addition, the pedal feeling can be adjusted through the pedal force compensation springs 26 by adjusting the action of the booster motor 1.

When the vehicle requires large braking deceleration, if the system determines that the regenerative braking force and friction braking force work together to meet the requirement of the vehicle for braking force, the electric control unit 10 issues control instructions to power off the first solenoid valve 29 and the second solenoid valve 32, and the electric control unit 10 analyzes the braking intention of the driver according to the pedal travel information, and calculates the total braking force FS required for this braking. For a new-energy vehicle, the electric control unit 10 calculates the regenerative braking force FR that the vehicle can generate at this moment according to the operating states of a power motor and a storage battery of the vehicle at this moment, the electric control unit 10 controls the first proportional valve 30 and the second proportional valve 33 simultaneously to generate corresponding degrees of opening, and the total braking force FS subtracts the regenerative braking force FR, so that the hydraulic braking force FH required for this braking is obtained, that is, FH=FS−FR. The electric control unit 10 obtains the value of assisted force required for the booster motor 1 through the booster characteristic curve according to the magnitude of the hydraulic braking force FH and sends a control instruction to the booster motor 1. The booster motor 1 produces the corresponding rotational speed and torque according to the instruction. An output shaft of the booster motor 1 drives the first gear 2 to drive the second gear 3 to rotate. The second gear 3 drives the lead screw 4 to translate to the right through the ball structure, thus pushing the first piston 12 to act on the first working chamber 22 filled with brake fluid, and act together with the master cylinder push rod 7 to provide voltage buildup for the first working chamber 22 in the brake master cylinder 5, and then pushing the second piston 21 to provide voltage buildup for the second working chamber 23, to generate hydraulic braking force in the brake wheel cylinder 36. Meanwhile, the regenerative braking device acts to generate regenerative braking force, and the two constitute the vehicle braking force together.

III. Active Braking Function:

For a vehicle equipped with a speed sensor and a ranging sensor, when the driver does not step on the brake pedal, that is, the pedal travel sensor 13 does not detect a displacement signal, when it is learned that the distance between the vehicle and the obstacle ahead is too short through the measurement of the speed sensor and ranging sensor, and braking measures must be taken to prevent collision or other dangerous behaviors, the electric control unit 10 analyzes a signal transmitted by other vehicle-mounted sensors, determines the active braking force required for the vehicle, and sends the instruction to the booster motor 1 through a control circuit. The booster motor 1 drives the first gear 2 to drive the second gear 3 to rotate according to the instruction, and the second gear 3 drives the lead screw 4 to translate to the right, thereby pushing the first piston 12 to translate to the right and drive the master cylinder push rod 7 to provide voltage buildup for the first working chamber 22 in the brake master cylinder 5 together, and then pushing the second piston 21 to provide voltage buildup for the second working chamber 23, so that active braking-by wire is achieved. Meanwhile, the master cylinder push rod 7 may also drive the pedal push rod 6 to translate to the right, so that the brake pedal at the driver will act, which will remind the driver of the danger ahead.

IV. Failure Backup Function:

When the booster motor 1 or a transmission part in the system fails due to failure, both the first solenoid valve 29 and the second solenoid valve 32 are in a power-off state. and both the first proportional valve 30 and the second proportional valve 33 are at the maximum degree of opening. When the driver steps on the brake pedal, the pedal push rod 6 can push the master cylinder push rod 7 to act on the first working chamber 22 filled with hydraulic fluid, thereby pushing the second piston 21 to establish hydraulic pressure in the second working chamber 23. The brake fluid can enter the hydraulic control unit 9 through the pipeline and then flow into the brake wheel cylinder 36 to meet the minimum requirement of the vehicle for braking force.

The invention claimed is:

1. An integrated electric booster braking system with a pedal force compensation function, comprising a booster motor, a first gear, a second gear, a lead screw, a brake master cylinder, a pedal push rod, a master cylinder push rod, a fluid storage tank a hydraulic control unit and an electric control unit;

wherein the first gear and the second gear are assembled in a housing; the first gear is engaged with the second gear; the booster motor is connected with the first gear and drives the first gear to rotate; the first gear drives the second gear to rotate during rotation; the second gear is in threaded connection with the lead screw; the second gear drives the lead screw to move duration rotation; the lead screw is of a hollow structure; a rear end of the lead screw is abutted with a front end of a first piston in the brake master cylinder; the pedal push rod penetrates through a side wall of the housing and then is inserted in an inner cavity of the lead screw; a rear end of the pedal push rod is hinged with a front end of the master cylinder push rod; a rear portion of the master cylinder push rod is inserted in the first piston in the brake master cylinder; the brake master cylinder is assembled at a rear end of the housing; the fluid storage tank is in communication with an inner cavity of the brake master cylinder by a pipeline; the inner cavity of the brake master cylinder is in communication with the hydraulic control unit through pipelines; the electric control unit is connected with the booster motor and the hydraulic control unit; and the electric control unit controls the operation of the booster motor and the hydraulic control unit;

a diameter of the first gear is less than the diameter of the second gear; a ball is disposed between the second gear and the lead screw for transmission; a mounting bracket is assembled in the housing; the second gear is connected with the mounting bracket by a bearing; two guide posts are disposed on the mounting bracket; slide blocks are sleeved on the guide posts respectively; a connecting frame is disposed between the two slide blocks; the front end of the lead screw is fixed to the connecting frame; and the lead screw drives the two slide blocks to synchronously slide on the guide posts during movement.

2. The integrated electric booster braking system with a pedal force compensation function of 1, wherein a pedal travel sensor is assembled on the pedal push rods; the pedal travel sensor is connected with the electric control unit; the pedal travel sensor transmits a real-time displacement data of the pedal push rod to the electric control unit; and a first reset spring is disposed between the pedal push rod and the side wall of the housing.

3. The integrated electric booster braking system with a pedal force compensation function of claim 1, wherein the first piston and a second piston are assembled in the inner cavity of the brake master cylinder; a first working chamber is formed in the inner cavity of the brake master cylinder between the first piston and the second piston; a second working chamber is formed between the rear end of the second piston and the rear end of the inner cavity of the brake master cylinder; a second reset spring is assembled in the second working chamber; the fluid storage tank is in communication with the first working chamber and the second working chamber respectively by the pipelines; the rear portion of the master cylinder push rod is inserted in first piston; the master cylinder push rod is of a diameter-variable structures; the diameter of the two end portions of the master cylinder push rod is greater than that of a middle portion of the master cylinder push rod; the outer diameter of the front end portion of the master cylinder push rod corresponds to the inner diameter of the inner cavity of the lead screw; a limit stop is disposed on the middle portion of the master cylinder push rod; and both sides of the limit stop are provided with pedal force compensation springs respectively.

4. The integrated electric booster braking system with a pedal force compensation function of claim 3, wherein the first working chamber is connected with the hydraulic control unit by a first fluid transfusion pipeline; the first fluid transfusion pipeline is equipped with a hydraulic pressure sensor, a first solenoid valve and a first proportional valve in sequence; the second working chamber is connected with the hydraulic control unit by a second fluid transfusion pipeline; the second fluid transfusion pipeline is equipped with a second solenoid valve and a second proportional valve in sequence; a connecting pipeline is disposed between the first solenoid valve and the second solenoid valve; the connecting pipeline is in communication with the fluid storage tank by a third fluid transfusion pipeline; the hydraulic pressure sensor, the first solenoid valve, the second solenoid valve, the first proportional valve and the second proportional valve are all connected with the electric control unit; the hydraulic pressure sensor can transmit a real-time data on the first fluid transfusion pipeline into the electric control unit; and the electric control unit controls the operation of the first solenoid valve, the second solenoid valve, the first proportional valve and the second proportional valve.

5. The integrated electric booster braking system with a pedal force compensation function of claim 4, wherein both the first solenoid valve and the second solenoid valve are two-position three-way solenoid valves.

6. The integrated electric booster braking system with a pedal force compensation function of claim 1, wherein the hydraulic control unit is connected with a brake wheel cylinder; and the hydraulic control unit controls the operation of the brake wheel cylinder.

\* \* \* \* \*